United States Patent
Moore

[11] 3,782,767
[45] Jan. 1, 1974

[54] RESILIENT, TUBULAR BUMPERS

[76] Inventor: Alvin Edward Moore, 916 Beach Blvd., Waveland, Miss. 39576

[22] Filed: Apr. 5, 1971

[21] Appl. No.: 131,024

[52] U.S. Cl.................. 293/71 R, 293/60, 114/219
[51] Int. Cl............................................. B60r 19/08
[58] Field of Search.................... 114/219; 267/116, 267/139, 140; 293/1, DIG. 2, 60, 62, 63, 64, 70, 71, 72, 88, 89, 71 R

[56] References Cited
UNITED STATES PATENTS

| | | | |
|---|---|---|---|
| 2,875,721 | 3/1959 | Downey | 114/219 |
| 2,885,989 | 5/1959 | Williamson | 114/219 |
| 3,493,257 | 2/1970 | Fitzgerald et al. | 293/71 R |
| 3,514,144 | 5/1970 | Alderfer | 293/71 R |
| 1,485,332 | 2/1924 | Edwards | 293/60 |
| 1,834,824 | 12/1931 | Brown | 293/71 P |
| 3,666,310 | 5/1972 | Burgess et al. | 293/71 R |

*Primary Examiner*—Robert G. Sheridan
*Assistant Examiner*—Robert Saifer

[57] ABSTRACT

A shock-absorbing bumper means (cushioning device for protecting cars, boats or other vehicles), comprising resilient tubular members of optional variation in cross-sectional shape, having tube-flattened portions, and containing gaseous material that may consist of: air, helium or other gas, preferably under pressure well above that of the atmosphere; cellular foam plastic; or, mixed with gas: a mass of mingled fibers, globules, or other small-diameter elements of small cross-sectional area (e.g., small, flexible, axially curved or straight tubes or rods of resilient rubber or other flexible or crushable material). The cushioning means may comprise separate bumpers at the front and rear of a vehicle, optionally also at the sides or it may extend all around a vehicle with or without integral, tube-flattened junctions between the tubular links. Each bumper element may comprise: only one flat-ended tube; a plurality of separate flat-ended tubes that are not strongly connected or a plurality of band-connected flat-ended tubes (tubular elements or links). The tubular elements are flexible, and because of their wider flattened ends may be long-repeatedly bent without damaging wrinkling, fracture of their material or change in length. Although this material may comprise gas-permeable resilient plastic (preferably enveloped in mesh or other fabric), it preferably is of ductile or resilient metal or of resilient, substantially impermeable, dense plastic. When of metal it may comprise thin copper, lead, aluminum, mild steel, or resilient steel, optionally sheathed in fabric.

30 Claims, 14 Drawing Figures

PATENTED JAN 1 1974　　　　　　　　　　　　　　　3,782,767
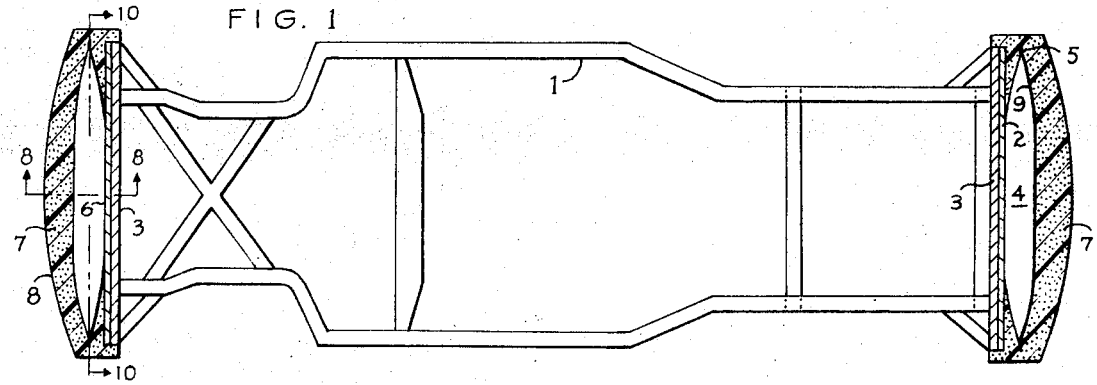
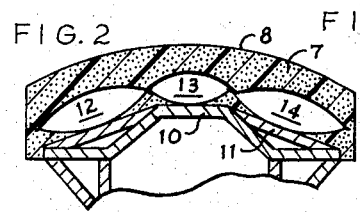
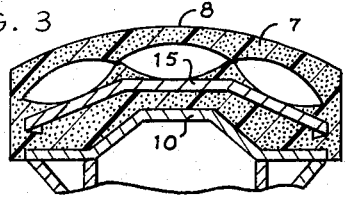
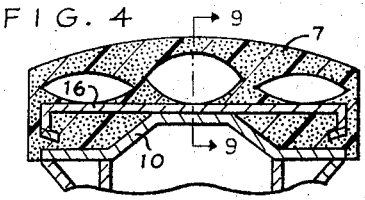
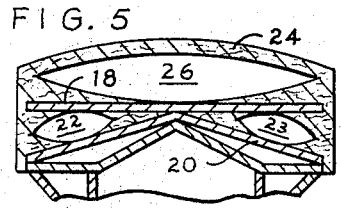
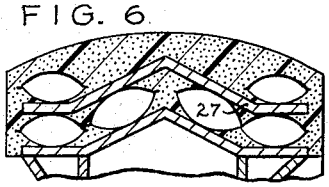
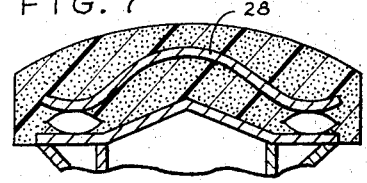
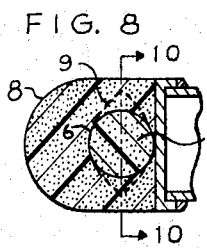
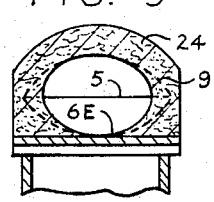
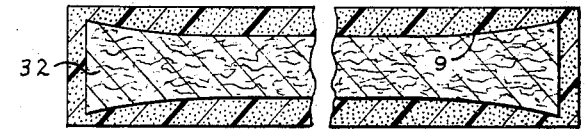
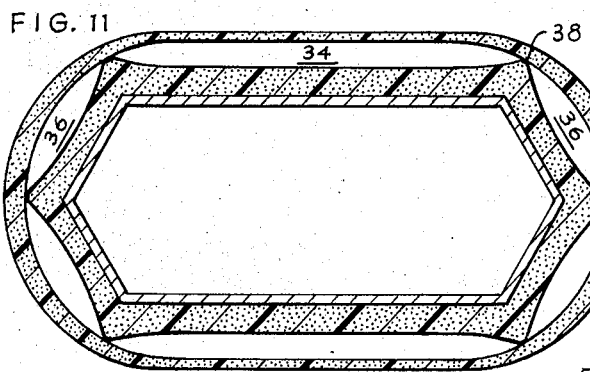
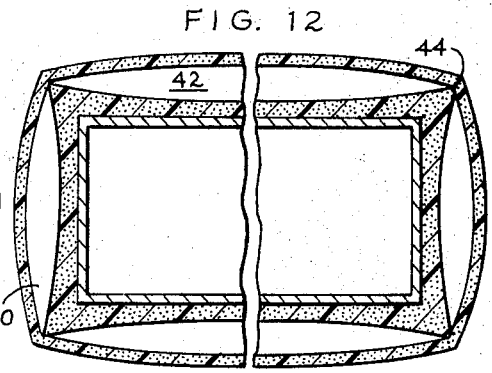
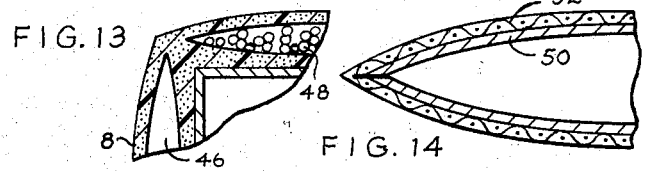
ALVIN E. MOORE,
INVENTOR.
BY
Alvin E. Moore,
ATTORNEY.

RESILIENT, TUBULAR BUMPERS

This invention pertains to flexible bumpers for protecting cars or other land vehicles, boats or other marine vessels, aircraft or spacecraft. In collisions the currently used car bumpers are easily damaged or disfigured, and in bending or breaking under strong inpacts transfer harmful, often destructive forces to car bodies. Present-day vehicles of other kinds also are prone to great damage in collisions and costly damage to bumpers in minor crashes.

In view of these facts, some objects of this invention are to provide: (1) resilient bumper means that yield under impacts, absorb forces of blows without appreciable damage to vehicular bodies or passengers, and after impact return to former bumper shape and appearance; (2) resilient bumpers, adapted for use at the front and rear of a vehicle or all around it, or in other places, comprising tubular elements that have tube-flattened ends and arcuate-in-cross-section middle portions, and gaseous material inside these elements; (3) resilient bumper means comprising flat-ended tubular elements that confine and under impact move force-absorbing yieldable material; (4) resilient bumper means having at least one tubular member that comprises a plurality of end-connected tubular elements each of which has tube-flattened portions and contains yieldable, force-absorbing material; (5) bumper means as in (4) above in which the yieldable material comprises a mixture of air and impact-movable, tube-filler elements (for example, fibers, small rods or globules); (6) bumper means as in (3) or (4) above, in which air or other gas, contained in the tubular elements, is under above-atmospheric pressure; (7) a flexible tubular member comprising at least one tubular element, having an arcuate-in-cross-section middle portion and tube-flattened end portions, permanently containing gas at above-atmospheric pressure, and having walls comprising lead in contact with the gas and constituting a ductile, permanently-sealed envelope that contains the gas; (8) a flexible, inflated tubular member as in (7) above, consisting of a plurality of the inflated, lead-comprising tubular elements that are joined in end-to-end arrangement. Other objects of the inventions will be apparent in the following specification and accompanying drawings.

In these drawings: FIG. 1 is a plan view of part of a land or other vehicle, comprising framework (exampled as a car chassis) and bumper means attached to the framework — shown as broken away and in section along a horizontal plane in the forward and rear bumper assemblies; FIG. 2 is a detail, sectional view from a plane containing tubular-element axes of a second form of the bumper means; FIG. 3 is a detail sectional view of a third form of the bumper means; FIGS. 4 to 7 are sectional views, similar to FIGS. 2 and 3, showing other forms of the invented bumper; FIG. 8 is a sectional view on enlarged scale from a plane comparable to that indicated at 8—8 in FIG. 1, illustrating cellular foam plastic as optional tube-filling resilient material — instead of air or other gas as in FIGS. 1 to 7; FIG. 9 is a sectional view from a plane like that indicated at 9—9 in FIG. 4, illustrating on a scale larger than that of FIG. 4 the type of central curvature of a short, flat-ended tube, and also indicating an optional type of the gaseous material that is exterior of a tubular member; FIG. 10 is a sectional view from a plane comparable to that indicated at 10—10 in FIG. 1 or FIG. 8, illustrating an optional type of the gaseous material that is interior of a tubular member — comprising mixed air or other gas and force-absorbing filler elements; FIGS. 11 and 12 are sectional views from vehicularly longitudinal planes of two body forms, each with bumper means that entirely surrounds the vehicular body and comprises a tubular member having band-connected tubular elements; FIG. 13 is a detail, sectional view of the bumper means, shown at a corner of a vehicle, that comprises tubular elements having tube-flattened ends that are connected only thru the foam rubber or other plastic that is exterior of the tubes; and FIG. 14 is a detail sectional view of a tubular element that comprises outer mesh or other fabric and an inner tube of lead or other ductile metal that contains gaseous material.

In each of the disclosed forms of the invented bumper assembly: (1) The tubular bumper means optionally may be only one or two sides of the vehicle (e.g., on its front and rear sides as illustrated in FIG. 1 — optionally also at the side-door sides of the frame), or may extend around a vehicular perimeter (e.g., as in FIGS. 11 to 13). (2) Each of the tubular members optionally may comprise only a single tubular element (as in FIGS. 1 and 10), or a plurality of narrow-band-joined elements (as in FIGS. 2, 3, 11 and 12), or tubular elements in a bumper sheath that do not have band-joined ends (as in FIGS. 4 to 7 and 13. (3) The gaseous material interiorly located in each of the concavely curved tubular elements or exterior of the tubular elements (in a bumper sheath) may be: (A) air, helium or other gas (preferably at a pressure above that of the atmosphere — for example, in the range of 5 to 15 pounds per square inch); (B) such optionally pressurized gas within the tubular elements or outer sheath, mixed with small, impact-movable filler elements of cross-sectional areas that are considerably smaller than the maximum area across their container (for example, less than an eighth of a tubular element's maximum cross section), these movable elements optionally being resilient, or else non-resilient and flexible (e.g., ductile) or frangible (some examples of them are plastic or fiberglass or asbestos fibers, steel wool, excelsior or the like (preferably resilient), hollow plastic or glass or metal globules, natural or synthetic-resin feathers or the like, expanded shale, small-diameter curved or straight tubes or rods, pellets or the like); or (C) gas-cell-containing foam plastic, preferably resilient. (4) The flexible material of the tubular elements optionally may be: metal (resilient in some constructions, ductile in others), optionally backed by flexibly-bonded mesh or other fabric, or impregnating fabric; dense, flexible plastic (optionally reinforced by fibers), backed by mesh or other fabric, or as plastic that impregnates fabric; or two or more plies of fabric and resilient rubber or other plastic (like the material or rubber hose or of tire casings). (5) When inflated by pressurized gas and having gas-permeable material, the tubular elements preferably are repeatedly inflatable thru gas-inlet, tire-like valves. And (6), when inflated by pressurized gas the tubular elements that comprise ductile or resilient, impermeable-to-gas metal or dense plastic have gas inlets (valves or small inlet tubes) that preferably are permanently sealed by bonding material (the gas-inlet tube may be flattened and sealingly welded, soldered, brazed or epoxy-glued — or if a valve is used its outer opening is filled and sealed with such bonding material).

FIGS. 1 to 13 illustrate various forms of resilient vehicle-cushioning means that comprise flat-ended, arcuate-in-middle-section tubular elements, containing gaseous material which may be any of the above-described kinds. Although in some constructions these tubular elements may be made of gas-permeable material (and then preferably imbedded in foam plastic), they preferably are permanently sealed and inflated, and comprise ductile or resilient metal. Copper is a good tube material; but currently thin lead, continuously and tubularly lining an exterior, lead-reinforcing envelope of mesh or other fabric, is preferred.

Lead has three important advantages of this bumper-tube use: (1) it is substantially impermeable to gas; (2) an inner tube may easily be made of thin sheet lead, the joints permanently sealed by simple application of heat, and a fabric envelope glued or otherwise held on its exterior surface; and (3) (critically important in metallic, impact-cushioning bumper tubes) the wall of a somewhat thin tube of lead may be bent thousands of times without fracture, and after each impact resume its shape because of the resilience of the pressurized gaseous material it contains.

FIG. 1 illustrates a simple type of the tubular-element-comprising cushioning means, as being at the front and rear of a chassis or other body frame 1; but optionally in this figure, as well as in FIGS. 2 to 7, bumpers that are similar to those shown may be placed also at the sides of a frame or body. The bumper assembly illustrated at each end of the vehicle in FIG. 1 comprises: a cushion-supporting, bumper attachment element, 2, of metal as shown or plastic, having a width substantially equal to the maximum depth of the bumper (in use attached by bonding material and/or bolts to the end plate 3 of the chassis or body frame); the tubular element 4, having sealed, tube-flattened ends, 5, and a middle, cross-sectionally arcuate portion, 6; gaseous material of one of the above-described types within the tube (exampled here as air or other gas); gaseous material, inclosing the tubes, shown here as cellular foam plastic, 7, exterior of the tube; and a bumper sheath, 8, of waterproof flexible material, optionally of rubber-coated cloth or other fabric, or a coat of dense flexible plastic or flexible paint on the foam plastic 7 (which may be formed in a mold).

As illustrated in FIG. 1, the tubular element 4 in its greatest cross-sectional area has a middle cylindrical portion (6) that is cylindrical, and from each end of this portion the tube smoothly curves to a flat end 5, in an inwardly and outwardly inclined portion, 9, which in the sectional plane of FIG. 1 slopes inward and in the sectional plane of FIG. 10 slopes outward, to each tube-flattened end. Each of these ends is wider than any cross-sectional diameter of the tube's curved parts, and may be made by bonding together in a band two flattened end portions of the originally cylindrical tube, or by thus bonding together two end parts of the flat rectangular plies of a tubular blank that is not inflated until it is thoroughly sealed in rectangular form.

The axial length along the axis of the tubular element of each of these slantingly curved portions 9 — from a plane of greatest tubular area to a flat-end band — depends on the diameter of the tube when it has a circular-in-cross-section shape, as at the cylindrical part 6. The substantially exact ratio of this length of the diameter may be mathematically calculated, but the present inventor has empirically determined that it is between two and three times the diameter; and of course the width (maximum dimension) of each of the flat end portions is half of the flattened circumference; approximately 1.57 times the diameter. Thus, a flat-ended bumper tube of the type of FIGS. 1, 8 and 10 that is 10 inches in diameter and 8 feet in length has the following approximate dimensions: two flat ends of 15.7 inches in upright dimension; a middle, 10-inch cylindrical part that is proportional to the diameter of the cylindrical part — in the neighborhood of 40 inches long; and two curvingly inclined portions 9, between the cylindrical part 6 and the flat ends, each of which is about 22 inches long.

The present inventor has discovered the following advantages in this type of tubular element, which are of especial value in resilient bumpers that are subject to long-repeated flexing and efficiently absorb the shocks of many impacts: (1) Because of its flat-end construction it may be impact-bent at a curved part without wrinkling of its material and without change in its axial length (either the tubular element is of resilient metal or resilient plastic or else it is of ductile metal or plastic and is resilient because it is filled with gaseous material under pressure; therefore, after the impact it returns to its former shape). (2) It may be made of impermeable, distortable material such as metal (which is preferred) or dense plastic without damaging wrinkling of the material. (3) It may have highly ductile lead-tube or lead-and-fabric (lead-tube-lined) walls that permanently contain gas at above-atmospheric pressure (with or without small filler elements mixed with the gas). (4) The tubular member may be flattened throughout its length from an originally cylindrical shape (thus removing the air from the tube) and bonded and sealed at its ends - or else made from two flat, rectangular plies, sealed at all their edges by bonding material (welding, solder, brazing, epoxy putty or the like). (5) It may be inflated thru a gas inlet with helium or the like (thus, without a vacuum pump or damaging wrinkling of the material, the tube may be efficiently inflated with non-aerial gas). (6) When the tubular member is to comprise a plurality of end-joined, inflated tubular elements or links that are connected together by flat, welded portions (as, optionally, in FIG. 12) and its elongated original tube is sealed at its ends and inflated with helium as in (5), the flattened portions between the tubular elements may be easily and efficiently welded by clamping the tube at their areas between clamps comprising electrically-heatable bars; there is no air then at the two welding lines or bands (of metal — e.g., copper or lead — or of the thermoplastic type of plastic) — only helium or other non-oxidizing gas, which facilitates the welding process.

The tube originally may be made by extrusion, or by bending a rectangular, thin-metal sheet blank around a cylindrical mandrel and welding or otherwise sealingly bonding its upper, longer edges. When its longer-side edges are welded the welding is preferably of the lap-weld type, and should be ductile so as to yield without fracturing its seal when the tube changes its shape. When the welded tube is then flattened its flat ends preferably are located in planes that are approximately parallel to the line or band of the lap weld.

If the tubular element has a circular-in-cross-section middle part (as, for example, in FIGS. 1, 10, 11 and 12) it necessarily has a length at least equal to the sum of the axial lengths of its two curvingly inclined portions.

When the tube is shorter than this sum, the sectional plane of the tube's greatest bulge is at the center of its length of intersects the tube in an endlessly curved perimeter that in cross section is not circular but instead is an ellipse (6E, FIG. 9), with its major dimension in the bonding plane between the lapped plies of the flat ends 5. With such a central-plane ellipse the tubular element necessarily is shorter than the combined lengths of its curvingly inclined portions.

Shorter tubular elements with elliptic central cross sections of this type are shown in FIGS. 2 to 7 and 9. In FIGS. 2 and 3 the adjacent flat ends of each pair of the tubular elements are optionally connected by a narrow welded or otherwise bonded band that may be formed from tube-flattened portions between electrically heated clamping bars as described above. The structure of FIG. 2 comprises a five-sided chassis combined chassis-and-bumper element 10, attached to the remainder of the vehicle. To this element 10, for extra strength, are welded two bars 11. When the tubular elements 12, 13 and 14 are separately formed and then connected together by a joint of flexible rubber, fabric or the like, the tube 13 preferably and as illustrated has a larger central cross section than that of tube 12 or 14; when they are integrally and clamp-weldedly formed from a single tube, the shorter central tube 13 has a smaller central-cross-sectional area than 12 and 14. When they are thus short and integrally formed: only when they are of the same length do they have the same central cross-sectional areas. This general rule also applies to the band-connected tubular elements of FIGS. 3, 11 and 12.

When there is a collision between the outer sheath 8 of FIG. 2 and another object the impact bends the sheath, and if the blow is weak the foam rubber or other flexible plastic 7 (or its equivalent mass of fibers, small rods, globules or the like) absorbs its force, and the sheath then returns to its former shape and appearance (optionally, this sheath may be made of tough, resilient plastic). When the blow is fairly hard its force is partly absorbed by 7 and partly by compressing one or more of the flat-ended tubes. And when the impact is quite severe one or more of the tubular elements is bent into nearly flattened-out, rectangular shape, and the chassis takes any residual force.

FIG. 3 illustrates a tubular member, comprising three end-connected tubular elements, that are flexibly glued or otherwise flexibly bonded to a bar, 15, that is floatingly imbedded in the foam plastic 7 and preferably has a dimension almost as deep as that of the sheath 8. (This sheath, in each of the inventive forms, preferably has a rounded nose shape and a flat top and bottom portion — as in FIG. 8 or FIG. 9). When the tubular elements of FIG. 3 receive force of a severe blow, already part absorbed by the exterior foam plastic 7, the inflated tubes first force the element 15 against the interior foam plastic, compressing it tightly between 15 and the chassis part 10. After the bar 15 is thus close to 10, if there is any unabsorbed force of the blow it causes one or more of the tubular elements to flatten toward rectangular shape.

FIG. 4 shows tubular elements that are end-connected only thru the foam plastic 7 and a bar, 16, having a depth similar to that of 15, but different in shape and bonded to the element 10, preferably at the time that the sub-assembled bumper is bolted and/or bonded to 10.

Preferably the bars 15 and 16 are of spring steel, as well as the similar elements in FIGS. 5 to 7. In FIG. 5 there are two such bars, 18 and 20; between them the short flat-ended tubular elements 22 and 23 are compressed under the force of a very severe impact; and in the preferably resilient filler elements 24 between the bar 18 and the nose portion of the sheath the larger flat-ended tube 26 is located. FIG. 6 shows one bar, 27, and short, flat-ended tubes on each side of it. And in FIG. 7 a bar 28 of uniform depth, constituting a bow spring, has sliding bearing on two short, flat-ended tubes, and in yielding compresses the filler elements that are within its inside, concavely curved surface. Each of these bars 15, 16, 18, 20, 27 and 28 has a depth substantially equal to or slightly less than the overall depth of the bumper, and is preferably resilient.

FIGS. 8 and 10 illustrate alternative types of the interior gaseous material (within the flat-ended tubular elements or the concave curvature of the tube-like element 28) that optionally may be substituted for the air or other gas that is indicated in most of the figures. This interior gaseous material is illustrated in FIG. 8 as foam plastic 30, and in FIG. 10 as optionally pressurized air mixed with filler elements of the above-described type, 32.

FIGS. 11 to 13 illustrate vehicle-inclosing bumpers that utilize resilient flat-ended tubular members comprising tubular elements. In the bumper of FIG. 11 these elements, 34 and 36, are shown as having equal central cross-sectional areas, and as such they necessarily are made from a plurality of original tubes of different diameters, and their flat-end bands are overlapped and bonded together. But preferably these elements are made from a single tube of uniform diameter with clamped and welded, flattened-tube portions (38) as described above; and then the elongated tubular elements 34 have central portions that are of larger cross-sectional area than that of the central planes of the shorter elements 36. In FIG. 12 the vehicle-end elements 40 are long enough to have either middle cylindrical portions or, as illustrated, central cross sections that are circular — as at 6 in FIG. 8. Therefore, the tubular elements 40 and 42 and their tube-flattend junction 44 may be integrally made from a single tubular stock.

FIG. 13 illustrates the flat ends of two tubes, inside flexible foam plastic and a bumper sheath, and indicates the manner in which such tubes, not end-connected by bands, may extend around the entire vehicle. This figure also illustrates ball or globules, 48, optionally resilient or frangible, preferably hollow, which may be used as filler elements, mixed with gas, in any of the disclosed tubular elements.

In each of FIGS. 11 to 13, the elongated tubular elements at the door sides of the vehicle (34 and 42 in FIGS. 11 and 12), the foam plastic or equivalent around them and the sheaths 8 may be utilized as running-board-like steps, for entry into or exit from the vehicle.

FIG. 14 illustrates an optional type of the tubular-element material that comprises ductile, interior-sealing metal, plastic or the like 50 and a backing, reinforcing envelope 52 of mesh or other fabric. Some ductile materials — for example, lead, tin, unalloyed aluminum and some plastics — have high ductility and capacity for a multiplicity of bendings without fracture, but have low tensile strength that make advisable that bumper-tube walls comprising them be either relatively thick or backed by reinforcing fabric.

Although the inner continuously tubular material 50 may be tin, copper or plastic, it is preferably lead. It may be separately shaped into a fabric-lining tube or it may be poured while in molten condition on the fabric 52. This fabric may be of nylon, asbestos, fiberglass, or network of mild steel, copper or aluminum (e.g., screen-wire fabric of hardware cloth, with the wire preferably of a diameter a little larger than that of commonly sold screening).

One method of making a leaden tubular article comprises the following steps:

1. Bending a thin, rectangular sheet of lead around a cylindrical mandrel, and overlapping its longer edges at the top of the mandrel;
2. Heat-joining the lapped edges by application of heat to them — e.g., from a blow torch or soldering iron;
3. Drilling a hole for a short gas-inlet tube (optionally, a valved tube like the metal part of an automobile tire valve), placing the gas inlet in the hole, and sealing around the inlet by application of sufficient heat at the hole to melt lead there and thoroughly seal around the inlet (extra lead or solder may be added around the valve);
4. Removing the mandrel, and flattening the tube, preferably throughout its length;
5. Heat-joining the tube-flattened end plies into sealed, welded bands;
6. Forming a sack-like envelope 52 of one of the above-described fabrics in rectangular shape and of a size to snugly fit over the flattened lead tube;
7. Diping the flattened lead tube 50 in plastic cement (e.g., rubber cement — "Pliobond" or the like);
8. Placing the flattened tube inside the envelope;
9. Soaking the fabric-backed tube in the cement used in step (7) long enough to thoroughly impregnate and coat the fabric (this fabric is preferably rather porous);
10. After the plastic cement sets, inflating the tubular member 50–52 with air, helium or other gas at above-atmospheric pressure; and
11. Permanently sealing the gas-inlet tube (if it is valved by placing lead or solder over its outer opening; if not valved by clamping, flattening and welding together tube-flattened plies of the outer end of the small tube).

Another method of making the tubular member comprises substitution of the above steps (1), (2) and (4) a step of extruding a seamless tube of ductile material (or purchasing an extruded tube; and steps (3) and (5) to (11) are unchanged.

Another process comprises:

1. Cutting a rectangular piece of nylon, fiberglass, asbestos cloth, wire-mesh or other fabric 52 that is not easily burned at the temperature of molten lead (327.4° C.);
2. Pouring molten lead (or other highly ductile material) in a thin layer on the entire surface of the fabric 52;
3. After the lead cools, running the composite material between rolls, flattening and smoothing the lead;
4. Bending the lead-and-fabric sheet 50–52 over a cylindrical mandrel, with the lead sheet next to the mandrel, and overlapping its longer edges.

Steps (5) to (10) are substantially the same as steps (2) to (5), (10) and (11) of the first above-described method.

A modification of the last-described of the above methods, after step (3), comprises: folding (doubling) the lead-and-fabric sheet along the central elongated line of the original lead-and-fabric rectangle (thus forming two lead-lining plies that are in contact); heat-joining the contiguous, long-side edges of the lead into a narrow, sealed band, and heat-joining the end edges of the lead into end bands, which may be wider than the side bands and optionally drilled with attachment holes (not breaking the seals).

In the claims, unless otherwise qualified: the term "tubular means" refers to a single tube or concavely curved element, of any cross-sectional shape, or a set of two or more end-connected tubular elements or links, of any cross-sectional shape; "tubular element" signifies: a single tube or a composite tubular member, of any cross-sectional shape; "plastic" means: any natural or synthetic plastic, including rubber, and plastic that contains reinforcing elements; "fabric" signifies: cloth, woven-wire network or any other mesh, including fibrous or plastic netting and expanded metal; "upright" means vertical or at an angle between 45° and vertical; "gaseous material:" gas alone, or gas mixed with non-gaseous filler elements, or cellular foam plastic; "filler elements:" fibers, globules, numerous curved or straight filler tubes, rods, or pellets or the like; and "gas" signifies any pure gas, or air or other mixture of gases.

I claim:

1. Resilient, vehicular bumper means, comprising:
Vehicle-body-attachment means of strength-providing material, constructed and arranged for attachment to the exterior of a vehicular body, comprising at least one upright, vehicle-attachment element;
bumper sheath means of flexible, waterproof material, connected to said upright element, having yieldable, free-to-move outer, upper and lower surfaces that in use are exposed to ambient air and flex under impacts;
within said sheath means, at least one flexible tubular element, having: tube-wall material comprising a ply of fabric and a ply of lead that is closely juxtaposed to said fabric; a straight axis; an arcuate-in-cross-section area of greatest tubular bulge in a middle part of said tubular element; a pair of planar, substantially flat end portions that are wider than the greatest cross-sectional dimension across said arcuate-in-cross-section middle part and located in upright planes that are substantially at the same angle to a horizontal plane; and a curvingly inclined portion, having continuously curved surfaces, between said area of greatest bulge and each of said end portions;
interior, shock-absorbing gaseous material within said tubular element; and exterior, shock-absorbing gaseous material between said sheath means and element.

2. Bumper means as set forth in claim 1, in which the said interior gaseous material comprises gas.

3. Bumper means as in claim 1, in which said gas is under a pressure above that of the atmosphere.

4. Bumper means as in claim 1 in which said interior gaseous material comprises particles of non-gaseous material mixed with said gas.

5. Bumper means as in claim 4, in which: said interior gaseous material comprises gaseous-cell foam plastic; said gas comprises gas in the foam-plastic cells; and said particles comprise plastic, connecting said cells.

6. Bumper means as in claim 4, in which said particles comprise fibers.

7. Bumper means as set forth in claim 1, in which the said exterior gaseous material comprises flexible foam plastic.

8. Bumper means as in claim 1, in which the said exterior gaseous material comprises particles of non-gaseous material and gas.

9. Bumper means as in claim 8, in which: said exterior gaseous material comprises gaseous-cell foam plastic; said gas comprises gas in the foam-plastic cells; and said particles comprise plastic, connecting said cells.

10. Bumper means as in claim 1, having a plurality of bumper elements, comprising tubular elements having said flat ends and curved surfaces.

11. Resilient, vehicular bumper means, comprising:
vehicle-body-attachment means, of strength-providing material, constructed and arranged for attachment to the exterior of a vehicular body, comprising at least one upright, vehicle-attachment element;
a bumper sheath of flexible, waterproof material, connected to said upright element, having yieldable, free-to-move outer, upper and lower surfaces that in use are exposed to ambient air and flex under impacts;
within said sheath, flexible tubular means comprising at least one tubular element, having: a straight axis; an arcuate-in-cross-section area of greatest tubular bulge in a middle part of said tubular element; a pair of planar, substantially flat end portions, wider than the greatest cross-sectional dimension across said arcuate-in-cross-section area, located in upright planes that are at substantially equal angles to a horizontal plane; and a curvingly inclined portion, having continuously curved surfaces, between said area of greatest bulge and each of said end portions;
interior, shock-absorbing gaseous material within said tubular element;
exterior, shock-absorbing gaseous material between said sheath and upright element; and
at least one upright, bowed, spring-like, substantially flat-ended bar, of resilient material, between said outer surfaces of the sheath and the said upright element, having concavely curved surfaces on its side toward said upright element that hold within their concavity a portion of said interior shock-absorbing material.

12. Bumper means as in claim 11, in which at least part of said exterior gaseous material is between said sheath and bar.

13. Bumper means as in claim 11 comprising at least one tubular element between said bar and upright element, having a middle portion that in cross section is arcuately curved, and tube-flattened end portions.

14. Bumper means as in claim 13, in which said bar is of metal, and is constructed and arranged for movement-permitting connection to a portion of said upright element.

15. Bumper means as in claim 11, comprising at least two tubular elements, adjacent to and in contact with said bar, each of said last-named tubular elements having: a middle portion that in cross section is arcuately curved; and tube-flattened end portions.

16. Bumper means as in claim 15, comprising a vehicular body portion, said bar having metallic connection with and bearing against said two tubular elements.

17. Bumper means as set forth in claim 1, in which the said upright element comprises part of a vehicular chassis.

18. Bumper means as set forth in claim 1, in which the said upright element comprises a metallic part of the bumper per se and is adapted to be connected to and bear against a vehicular chassis.

19. Resilient, vehicular bumper means, comprising:
vehicle attachment means, constructed and arranged for attachment to the exterior of a vehicle, comprising at least one upright, vehicle-attachment element of vehicle-strength-providing material;
bumper sheath means of flexible waterproof material, connected to said upright element, having yieldable, free-to-move outer, upper and lower surfaces that in use are exposed to ambient air and flex under impacts;
within said sheath means, at least one flexible tubular element, having tubular walls and closure means of material that comprises a sheet-like layer of element-strength-providing material and a layer of thin lead that is closely juxtaposed to said sheet-like layer;
shock-absorbing gaseous material in said tubular element;
connecting means between the said tubular element and said upright vehicle-attachment element, permitting movement, under shock of collision, of portions of said tubular element toward said upright element; and
shock-absorbing gaseous material between said tubular element and said outer surfaces of the bumper sheath means.

20. Bumper means as set forth in claim 19, in which said shock-absorbing gaseous material in said tubular element comprises gas under above-atmospheric pressure.

21. Bumper means as set forth in claim 19, in which said shock-absorbing gaseous material between said tubular element and said outer surfaces comprises foamed plastic.

22. Bumper means as set forth in claim 19, in which said shock-absorbing gaseous material between said tubular element and said outer surfaces of the bumper sheath means comprises a multiplicity of resilient filler elements.

23. Bumper means as set forth in claim 22, in which said filler elements comprise excelsior.

24. Resilient, vehicular bumper means, comprising:
vehicle-body-attachment means having at least one upright, vehicle-attachment element of strength-providing material; bumper sheath means of flexible, waterproof material, having yieldable, free-to-move outer, upper and lower surfaces that in use are exposed to ambient air and flex under impacts; and a plurality of bumper elements within said sheath means; each of said bumper elements comprising:
a flexible tubular element having: a straight axis; an arcuate-in-cross-section area of greatest tubular bulge in a middle part of said tubular element; a pair of planar, substantially flat end portions, wider than the greatest cross-sectional dimension across said arcuate-in-cross-section area, located in upright planes that are substantially at the same angle to a horizontal plane; and a curvingly inclined portion, having continuously curved surfaces, between said area of greatest bulge and each of said end portions;

interior, shock-absorbing gaseous material within said tubular element; and exterior, shock-absorbing gaseous material between said sheath means and tubular element;

each pair of the said end portions comprising integrally joined, substantially flattened portions of a single tube.

25. Vehicular bumper means, comprising:

vehicle-attachment means, for attachment to the exterior of a vehicle, comprising at least one upright, vehicle-attachment element, of stiff, strength-providing material, having a length at least equal to three-fourths of the width of the vehicle to which the bumper means is to be attached;

bumper sheath means of flexible, waterproof material, connected to said upright element, having yieldable, free-to-move outer, upper and lower surfaces that in use are exposed to ambient air and flex under impacts;

within said sheath means, at least one bar of stiff material, non-rigidly connected to said upright, vehicle-attachment element, inwardly movable toward said upright element, having a length that is at least equal to three-fourths of the length of said upright element, and having outwardly jutting bar portions that are constructed and arranged to provide a valley-like shock-absorbing space, formed by inward bar surfaces that diverge from a middle part of said valley-like space toward said vehicle-attachment element, the said valley-like space opening toward the vehicle-attachment element;

inner flexible means for connecting the inner side of said bar to said vehicle-attachment element, adapted to absorb minor shocks of collision and to transmit force of major collision shocks to said element, comprising shock-absorbing gaseous material, at least part of which is within said valley-like space, in contact with said inward, diverging bar surfaces; and outer flexible means for connecting the outer side of said bar to said sheath, comprising shock-absorbing gaseous material.

26. Bumper means as set forth in claim 25, in which the said gaseous material of said inner flexible means comprises foamed plastic; and said inner flexible means further comprises: at least one tubular element, imbedded in said foamed plastic; and shock-absorbing gaseous material in the said tubular element.

27. Bumper means as set forth in claim 25, in which: the said gaseous material of said outer flexible means comprises foamed plastic; and said outer flexible means further comprises at least one tubular element, imbedded in said foamed plastic, and gaseous material within the said tubular element.

28. Resilient, vehicular bumper means, comprising:

a vehicular body portion, having forward, lateral and rear sides;

vehicle-body-attachment means, of strength-providing material, constructed and arranged for attachment to the exterior of said vehicular body portion, comprising at least one upright, vehicle-attachment element;

bumper sheath means of flexible, waterproof material, connected to said upright element, having yieldable, free-to-move outer, upper and lower surfaces that in use are exposed to ambient air anf flex under impact;

within said sheath means, at least one tubular element on each of said sides of the vehicular body portion, each having: a straight axis; an arcuate-in-cross-section area of greatst tubular bulge in a middle part of said tubular element; a pair of planar, substantially flat end portions that are wider than the greatest cross-sectional dimension across said arcuate-in-cross-section middle part and located in upright planes that are substantially at the same angle to a horizontal plane; and a curvingly inclined portion, having continuously curved surfaces, between said area of greatest bulge and each of said end portions;

shock-absorbing gaseous material in said tubular element;

metallic connecting means between each adjacent pair of said tubular-element end portions, on at least three of said sides; and exterior shock-absorbing gaseous material between said sheath means and vehicle-attachment element.

29. Bumper means as set forth in claim 25, in which at least two of said bar portions are joined in an angle, forming said valley-like space.

30. Bumper means as set forth in claim 25, in which: the said outwardly jutting bar portions have continuously curved outer and inner surfaces; and at least part of said inner, flexible, shock-absorbing means is compressed in said valley-like space during collision shocks.

* * * * *